(12) United States Patent
Bearden et al.

(10) Patent No.: US 8,747,520 B2
(45) Date of Patent: Jun. 10, 2014

(54) CARBON DIOXIDE CAPTURE FROM POWER OR PROCESS PLANT GASES

(75) Inventors: Mark D. Bearden, Richland, WA (US); Paul H. Humble, Kennewick, WA (US)

(73) Assignee: Battelle Memorial Institute, Richland, WA (US)

(*) Notice: Subject to any disclaimer, the term of this patent is extended or adjusted under 35 U.S.C. 154(b) by 286 days.

(21) Appl. No.: 13/100,135

(22) Filed: May 3, 2011

(65) Prior Publication Data

US 2011/0265512 A1    Nov. 3, 2011

Related U.S. Application Data

(60) Provisional application No. 61/330,709, filed on May 3, 2010.

(51) Int. Cl.
*B01D 53/02* (2006.01)
*B01D 53/14* (2006.01)

(52) U.S. Cl.
USPC .............. 95/41; 95/42; 95/92; 95/94; 95/117; 95/139; 95/231; 95/236

(58) Field of Classification Search
USPC ........... 95/210, 211, 228, 230, 236, 232, 233, 95/234, 235, 149; 96/290, 295, 270, 271, 96/273, 277, 322
See application file for complete search history.

(56) References Cited

U.S. PATENT DOCUMENTS

| | | | | |
|---|---|---|---|---|
| 4,369,167 A | * | 1/1983 | Weir, Jr. | 423/210 |
| 2004/0242826 A1 | * | 12/2004 | Nishimura | 526/317.1 |
| 2007/0277674 A1 | * | 12/2007 | Hirano et al. | 95/290 |
| 2008/0173585 A1 | * | 7/2008 | White et al. | 210/656 |
| 2009/0013717 A1 | * | 1/2009 | Darde et al. | 62/617 |
| 2009/0202410 A1 | * | 8/2009 | Kawatra et al. | 423/232 |
| 2009/0266107 A1 | * | 10/2009 | Singh et al. | 62/617 |
| 2011/0173981 A1 | * | 7/2011 | Dube et al. | 60/651 |
| 2011/0207002 A1 | * | 8/2011 | Powell et al. | 429/410 |
| 2011/0247360 A1 | * | 10/2011 | Hasse et al. | 62/606 |

FOREIGN PATENT DOCUMENTS

| | | |
|---|---|---|
| WO | 2007140261 A2 | 12/2007 |
| WO | 2009047341 A1 | 4/2009 |
| WO | 2009070785 A2 | 6/2009 |
| WO | WO 2009121008 A2 * | 10/2009 ............. F01K 23/06 |

OTHER PUBLICATIONS

International Search Report and Written Opinion for International Application No. PCT/US2011/035037, International Filing Date May 3, 2011, Date of Mailing Jan. 4, 2012.

* cited by examiner

*Primary Examiner* — Duane Smith
*Assistant Examiner* — Cabrena Holecek
(74) *Attorney, Agent, or Firm* — A. J. Gokcek; Derek H. Maughan

(57) ABSTRACT

The present invention are methods for removing preselected substances from a mixed flue gas stream characterized by cooling said mixed flue gas by direct contact with a quench liquid to condense at least one preselected substance and form a cooled flue gas without substantial ice formation on a heat exchanger. After cooling additional process methods utilizing a cryogenic approach and physical concentration and separation or pressurization and sorbent capture may be utilized to selectively remove these materials from the mixed flue gas resulting in a clean flue gas.

7 Claims, 6 Drawing Sheets

CARBON DIOXIDE CAPTURE FROM POWER OR PROCESS PLANT GASES

This invention was made with Government support under Contract DE-AC0576RLO1830 awarded by the U.S. Department of Energy. The Government has certain rights in the invention.

PRIORITY

This invention claims priority from a provisional patent application No. 61/330,709 filed May 3, 2010 the contents of which are hereby incorporated by reference.

BACKGROUND OF THE INVENTION

1. Field of the Invention

The invention generally relates to flue gas cleaning and more particularly to carbon dioxide capture in industrial applications.

2. Background Information

The continued use of carbon based fuels continues to cause atmospheric pollution to rise at an unprecedented rate. While "cleaner" forms of energy have been explored, none of these other forms of energy have been sufficiently developed or disseminated to obtain wide spread use sufficient to replace the present carbon based methodologies. Therefore a variety of technologies and methodologies are currently being sought to attempt to address this issue. However, in attempting to address these issues a variety of other issues and practical and economic realities arise. One of the problems is the presence of varying constituents within a typical flue gas stream. The selective capture, sequestration and removal of these materials all depend upon differing characteristics which may conflict for the capture of other materials. As a result, many scrubbing technologies focus on one or two constituents but allow other pollutants to escape. Other problems arise as various technologies may not lend themselves to practical applications for scale up to millions of pounds of materials that are to be processed in relatively short periods of time (typically an hour). Furthermore, many configurations are economically unfeasible for a variety of reasons. This has led to confusion, disagreement and difficulty in configuring a system and employing a method for a comprehensive pollutant removal system.

Of particular concern in these arrangements is the ability to capture and sequester carbon dioxide. One of the problems with sequestering carbon dioxide is the requirement that carbon dioxide be captured in a relatively pure form before it can be sequestered. The existing $CO_2$ capture technologies are typically not efficient or cost effective when considered in the context of a typical coal-fired power plant. For example, to produce 550 MW of power from coal with 90% $CO_2$ capture using amine scrubbing reduces the power plant electrical generation efficiency from 39.1% to capture and 27.2%. (DOE NETL report 2007/1281 Cost and Performance Baseline for Fossil Energy Plants Volume 1: REV 1: August 2007). Reducing power consumption at a reasonable capital cost is a prerequisite to enable plants to capture and sequester $CO_2$.

The present inventions provide various methodologies for obtaining a resolution in addressing these matters. The present inventions provide methods and systems that offer a substantial reduction in cost and increases in efficiency compared to other proposals that are well known. Furthermore the present invention is more readily adaptable for use in existing industrial applications than many other proposed applications. Additional advantages and novel features of the present invention will be set forth as follows and will be readily apparent from the descriptions and demonstrations set forth herein. Accordingly, the following descriptions of the present invention should be seen as illustrative of the invention and not as limiting in any way.

Various advantages and novel features of the present invention are described herein and will become further readily apparent to those skilled in this art from the following detailed description. In the preceding and following descriptions we have shown and described only the preferred embodiment of the invention, by way of illustration of the best mode contemplated for carrying out the invention. As will be realized, the invention is capable of modification in various respects without departing from the invention. Accordingly, the drawings and description of the preferred embodiment set forth hereafter are to be regarded as illustrative in nature, and not restrictive.

SUMMARY OF THE INVENTION

The present inventions are processes for removing pollutants including $CO_2$ from a flue gas stream. While the described preferred embodiments included herein describe for treating flue gas from a coal fired power plant, other flue gas streams and certain pollutant containing process streams may also be treated by the invention. Thus, this description is meant to be illustrative but not limiting to the invention.

In one embodiment of the invention a method for removing preselected substances from a mixed flue gas stream is described wherein a mixed flue gas is cooled by direct contact with a liquid quench to condense at least one preselected substance to a solid and form a cooled flue gas without substantial ice formation on a heat exchanger surfaces. Various target substances can be removed through such a process including $CO_2$, $SO_2$, $NO_2$, $HCL$, $H_2SO_4$, $SO_3$, Hg, As, Se in various forms and conjugates. Once cooled, in some embodiments solids can then be physically concentrated with a device such as a filter, sieve, hydroclone, or other similar device and separated by a process such as distillation, extraction, sublimation or some other traditional separation method. In order to preserve the energy efficiency of the system heat exchange between refrigerants and the quench liquid may be performed in order to cool the mixed flue gas.

The quench liquid and the manner of contacting the gas with the quench liquid may be embodied in a variety of forms. In one embodiment the contact between said mixed flue gas and said quench liquid is performed by a quench tower. Any of a variety of materials may be utilized as quench liquid provided that the quench liquid has a freezing point lower than the freezing temperature of water. Examples of quench liquids include alkaline water baths, 1-propanol, methanol, triethylene glycol, and SELEXOL (polyalkylene glycol dimethyl ether (PGDE). Depending upon the type of quench liquid utilized the formation of solids and densified liquids may cause some substances to sink in the quench. In some embodiments a slurry may be formed which can be pumped to increase its pressure to above the carbon dioxide triple point and delivering the slurry to a system of heat exchangers that melt the ice into liquid using condensing refrigerant as the heat source.

In one embodiment the invention is utilized in a process for removing CO2 from a flue gas stream, in such an arrangement the process includes directly contacting a flue gas stream with a quench liquid to form an ice containing $CO_2$, concentrating said $CO_2$ containing ices; and separating said $CO_2$; wherein said ice is not formed on a heat exchanger surface. The separation of materials in the invention may be accomplished in a variety of ways including distillation, sublimation, the use of sorbents (absorbents or adsorbents or both) or methods of separation readily apparent to a party of skill in the art.

In one application separation is performed by sublimation utilizing a heat pump to sublime ice from the cold liquid. In some embodiments the cooling steps are accomplished using a cold clean low pressure flue gas on the outside surface of a conduit and a condensing refrigerant on the inside surface of the conduit.

In other embodiments of the invention the removal and treatment of the gas is performed utilizing a compression mechanism. In one embodiment of such an invention preselected materials are removed and treated from a mixed gas flue stream, by cooling the mixed flue gas by direct contact with a liquid quench to form a cooled flue gas; compressing the cooled flue gas; cooling the cooled flue gas by cross exchange; sorbing a preselected material with a sorbent; and desorbing the preselected material from said sorbent. In such a configuration sorbents can be an absorbent or adsorbent and are preferably capable of regeneration and reuse. In addition to the basic method outlined above a variety of other steps may also be included. For example, while cooling and compressing the gas will remove most of the water, in some circumstances it may be desirable to include a water scavenging sorbent to further reduce the quantity of water within the cooled compressed effluent gas. Additionally, in some instances it may be desirable to reduce the pressure on the system to affect effluent gas release, or to heat a $CO_2$ sorbent to release $CO_2$. In some instances a lean sorbent formed by the release of the $CO_2$ could be released back to the system and reused for additional gas capture. To assist in enhanced energy efficiency lean flue gas exiting the absorber can be heated by cross exchange with incoming rich flue gas; and the lean flue gas can be expanded to near ambient pressure.

In one specific example described hereafter; a mixed flue gas from a coal fired power plant supplies flue gas from the plant that is water saturated at 135° F. This flue gas is then cooled by direct contact in a quench tower shown in FIG. 1 to about 90° F. The quench water is cooled by heat exchange with cooling water and caustic is added to maintain the pH to near neutral. The cooled gas is compressed to approximately 120 psia in multistage intercooled compressors. Additional water is condensed from the compressor inter and after coolers. After compression the gas is dried to near zero water content by methods such as triethylene glycol or a small pore molecular sieve. The drier may be regenerated by pressure swing or thermal swing methods. The compressed gas is cooled to the desired temperature of approximately −35° F. by cross exchange with cold gas formed from the expansion of compressed flue gas downstream of the gas absorption. $CO_2$ and other pollutants are absorbed from the compressed flue gas by absorption into a physical sorbent such as propylene carbonate or methanol at approximately −35° F. While these absorbents are known to be effective, other sorbents and adsorbents including ionic liquids and solid sorbents may be enabled by the gas dehydration. Following absorption of pollutants, the treated gas exits the absorber and is expanded to near atmospheric pressure in a gas expander/generator that generates a substantial amount of electric power. The absorbent and absorbed pollutants exit the absorber and are heated with the returning regenerated absorbent and flow through a hydraulic turbine to partially recover pumping energy required for the return of the regenerated sorbent to the absorber. The absorbent and adsorbed pollutants enter a gas-liquid separator to release a part of the pollutants as vapor. The liquid sorbent and remaining absorbed pollutants are then further heated in a stripper to remove the remaining pollutants captured from the flue gas. The regenerated absorbent is then returned to the absorber to repeat the process.

Various advantages and novel features of the present invention are described herein and will become further readily apparent to those skilled in this art from the following detailed description. In the preceding and following descriptions I have shown and described only the preferred embodiment of the invention, by way of illustration of the best mode contemplated for carrying out the invention. As will be realized, the invention is capable of modification in various respects without departing from the invention. Accordingly, the drawings and description of the preferred embodiment set forth hereafter are to be regarded as illustrative in nature, and not as restrictive.

DETAILED DESCRIPTION OF THE INVENTION

Figure 1:
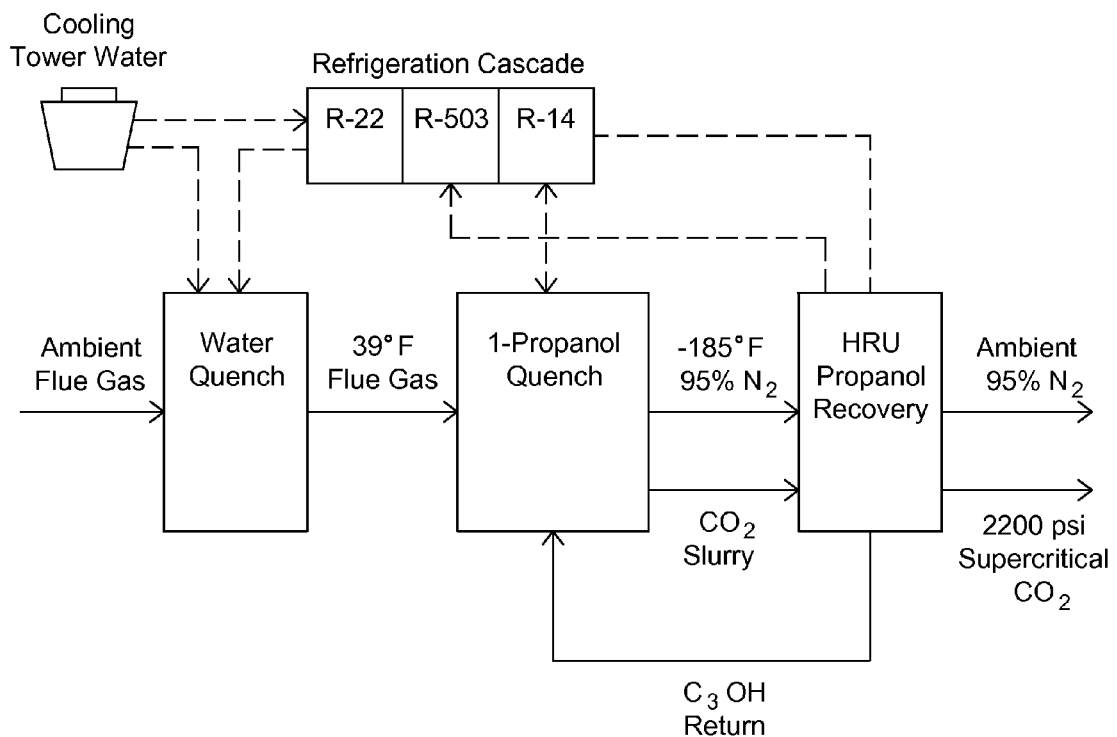
FIG. 1 is an illustration of one embodiment of the present invention.
Figure 2:
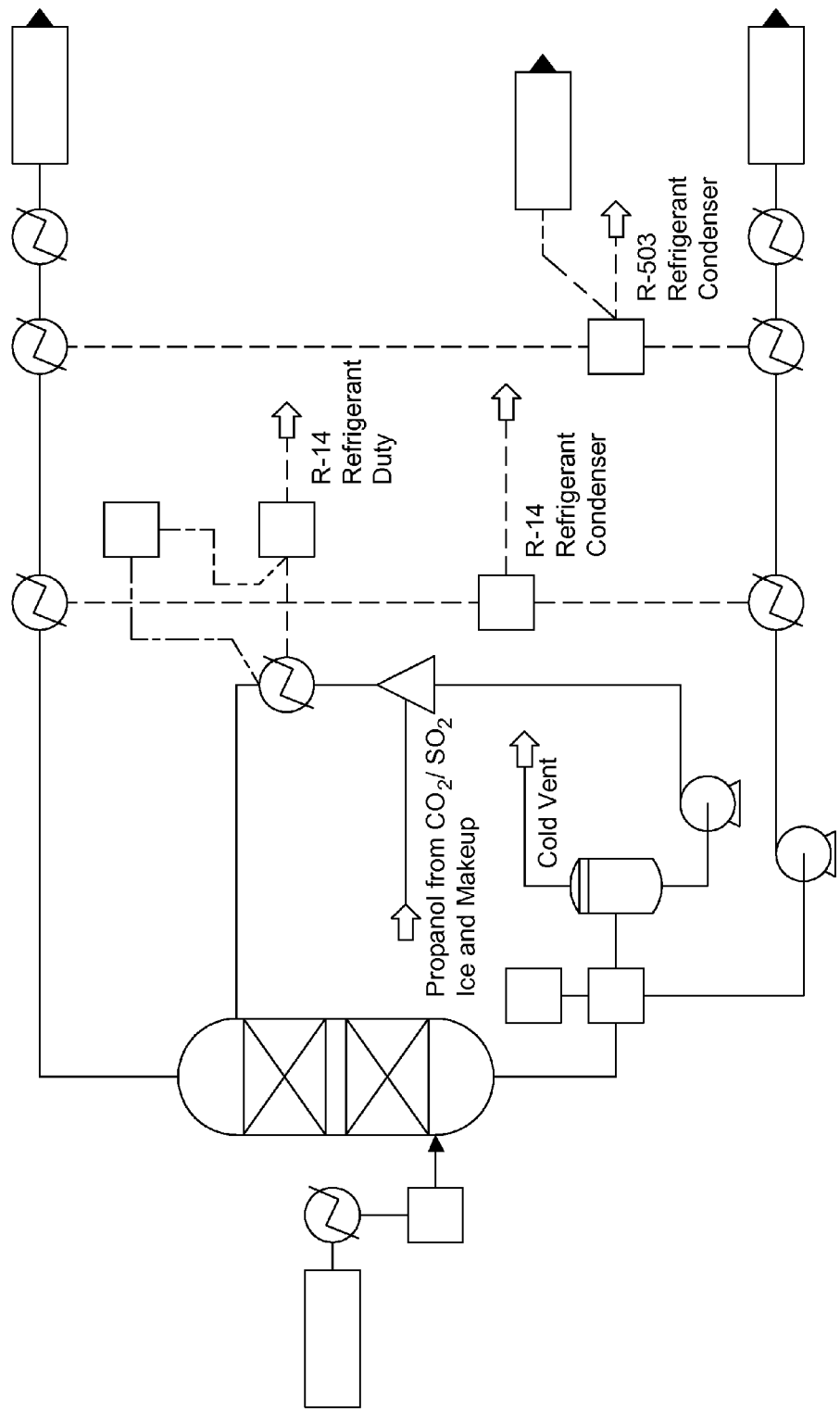
FIG. 2 is an illustration of a second embodiment of the present invention.
Figure 3:
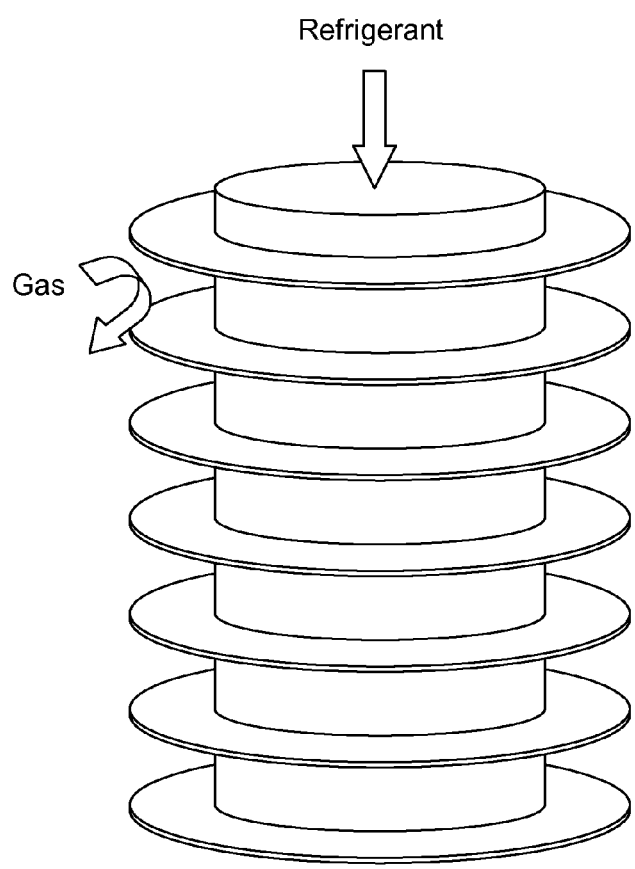
FIG. 3 is a drawing of the tubular heat exchangers. Finned surfaces on the flue gas side increase the area on the gas (poor heat transfer) side process while the refrigerant boils (good heat transfer) on the lower area inside of the tubes.
Figure 4:
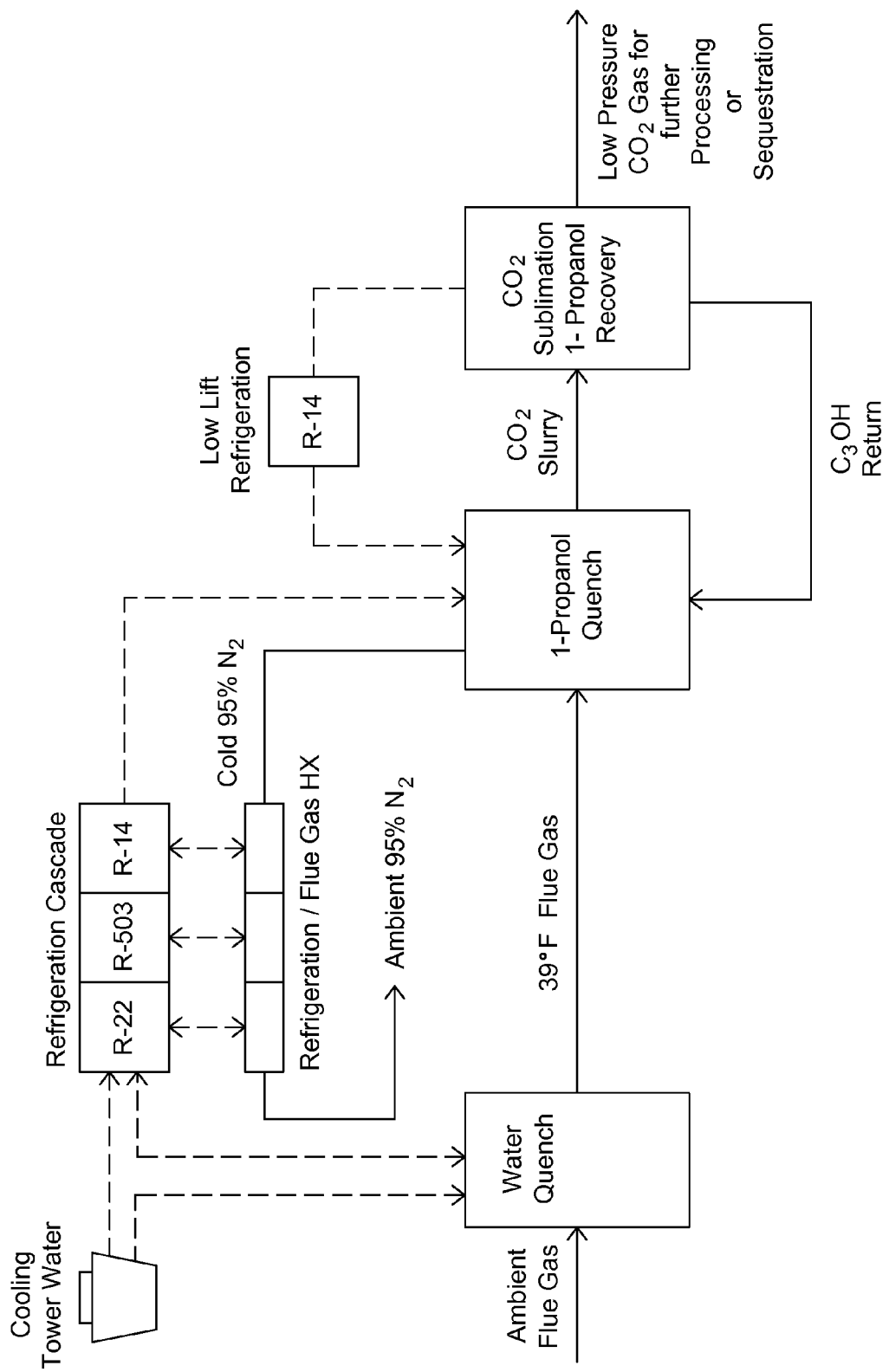
FIG. 4 is a block diagram of a third embodiment of the present invention.

The present invention is a process for removing pollutants from a gas stream. A demonstrative example of the preferred embodiment of the present invention is shown in FIGS. 1-6. The methods of the present invention utilize cooling of a mixed gas stream by direct contact between the mixed gas and single or multiple liquids to condense preselected substances from the mixed gas stream and form a cold cleaned gas. Depending upon the needs and necessities of the user this separation can be further enhanced by the concentrating of solids (ices) formed in the liquids with physical separation devices such as hydroclones or self-cleaning filters, and then separated using various separation processes such as distillation, extraction, or membranes can then be utilized to recover the preselected substances in a concentrated or pure form for further processing or disposal. In other embodiments of the invention the cooled gasses are compressed, treated with sorbents, (adsorbents or absorbents) and then released through temperature and pressure swings. More detailed descriptions follow:

Looking first to a direct contact two stage cooling system. In such an arrangement the flue gas enters the system and is cooled and partly dehydrated. Preferably, this is done using counter-current trayed or packed columns with the flue gas flowing upward and water flowing downward in one or more stages of contacting. Spray towers or other gas-liquid contactors are also suitable. The processes such as those shown in FIGS. 1, 2 and 4 are capable of being performed in such a configuration.

In the first stage (bottom) the water loop is cooled by heat exchange with cooling water. The second stage is cooled with a high temperature refrigerant such as R-22 to a temperature slightly greater than the freezing point of water (preferably 39 degrees F.) such that water ice formation does not occur. During the gas cooling process, water vapor from the flue gas is partially condensed, (For example the water vapor may comprise about 8 mass % of the entering flue gas but only about 0.5 mass % exiting at ~39° F. from the cooler. This water is directly assimilated in the circulating quench loop and excess water produced may be re-used for other process requirements such as cooling water makeup. In this way the high latent heat of the water vapor is being rejected to the least expensive cooling utilities. In contrast to prior art embodiments, which while intrinsically simple, suffer from various frailties. In the prior art the flue gas temperature drops below the acid gas dew point resulting in condensation of very corrosive sulfuric, hydrochloric, and carbonic acids on the surface of the heat exchanger tubes. Teflon coatings or the use of glass tubes for this service has been proposed to mitigate this problem, but these methods further decrease the intrinsic poor heat transfer of a low pressure gas to gas system and increase its cost. In contrast, in the circulating quench system, the entire pH of the system can be easily controlled by the injection of alkaline material such as trona, caustic, or lime for cleaning acid gases such as flue gas.

Heat exchange between the circulating quench water and cooling water is nearly 100 times better than for a flue gas cross exchanger—resulting in nearly a hundred fold reduction in the exchanger area required. There are no large scale applications of condensing heat exchangers in coal fired power plants. In contrast, direct contact quench towers are commonly used throughout the chemical and petrochemical industry and are proven reliable and effective devices for large scale applications. Fan horsepower to push the flue gas through the very large gas to gas heat exchangers will substantially decrease the net electric power output of the plant. In contrast the quench towers incorporate structured packing materials that have demonstrated extremely low pressure drop in virtually all applications.

It is not necessary to use the direct contact quench for the invention, but it is energetically advantageous to do so. The power requirements to cool the flue gas to near the freezing point of water are much lower using cooling water and high temperature refrigerant than the fan power required to move the gas through a large heat exchanger. Preferably the pH of the water is maintained at near neutral conditions with the addition of a base such as sodium hydroxide, trona, etc. Strong acid components of the flue gas including sulfur trioxide, hydrogen chloride, nitrogen dioxide are largely removed in this stage. Volatile vapors such as mercury, selenium, arsenic and the like are partially removed by condensation and assimilated within the aqueous phase.

Exiting the direct contact quench, the cooled flue gas which has now condensed out most of its water and is then directed to the cold liquid, ice slurry contactor. One preferred liquid is 1-propanol. 1-Propanol is preferred 1) because its freezing temperature (−196° F.) is low enough to capture more than 90% of the carbon dioxide from the flue gas; 2) it is non-corrosive; 3) relatively non-toxic and 4) it freezes materials such as water, sulfur oxides, carbon dioxide and the like into ices that are denser than 1-propanol allowing them to sink to aid separation. While 1-propanol is described in the present preferred embodiment it is to be distinctly understood that the invention is not limited thereto but may be variously embodied and configured to incorporate a variety of other materials essentially any liquid which has a freezing point lower than water may be utilized. Examples of preferred materials include water containing suitable components to control the water pH water (alkaline); 1-propanol or methanol, triethylene glycol, Selexol or other liquids having freezing temperatures less than the freezing temperature of water. The refrigerants may be one or more of the refrigerants included in the American Society of Heating, Refrigerating and Air-Conditioning Engineers (ASHRAE) lists. Preferably non-ozone depleting refrigerants are used.

In other embodiments the gas-liquid contact is a conventional countercurrent gas/liquid contact containing trays, packing or other internal materials to form effective contact between the gas and liquid. Preferred examples to those skilled in the art are distillation columns with internal such as sieve trays, bubble cap trays, random dumped packing or structured packing. Other suitable gas liquid contacting equipment includes but is not limited to, spray towers, venture scrubbers and quench quench rings. Concentration of the solids form the cold liquid is performed using a physical device such as a hydroclone, extruder, or self-cleaning filter. Separation of the materials may then be performed by distillation, sublimation or a traditional separation process.

The method of the present invention can be utilized to separate a variety of materials including $CO_2$, $SO_2$, $NO_2$, HCL, $H_2SO_4$, $SO_3$, mercury (metal or compounds), arsenic (metal or compounds), selenium (metal or compounds) and other compounds known to be emitted in the flue gas of coal fired power plants or other industrial process streams. While these examples are provided and described it is to be distinctly understood that the invention is not limited thereto but may be variously alternatively embodied according to the needs and necessities of the user. In one particular embodiment the invention is a method for removing preselected materials including $CO_2$ from a flue gas stream that includes the steps of directly contacting a flue gas stream with a one or a plurality of liquids to cool the gas below the freezing or dew points of preselected compounds to remove these compounds from the gas as condensates or ices without forming a substantial amount of ice on a heat exchanger surface. In one embodiment the flue gas is further cooled with a cold liquid less dense than the freezing point of selected materials into solids that are denser than 1-propanol and thus sink, and then concentrated by size utilizing a physical separation means such as a hydroclone. In some embodiments a concentrated slurry of cold liquid and mixed component solids is pumped to increase its pressure to above the carbon dioxide triple point and delivered to a system of heat exchangers that melt the ice into liquid using condensing refrigerant as the heat source. In other embodiments separation is performed by distilling $CO_2$ and other preselected compounds from the cold liquid, while in others separation is performed by sublimating ices such as $CO_2$ and $SO_2$ for separation from cold liquid.

In some application the sublimation is performed using a heat pump. In some applications the heat transfer is accomplished using cold clean low pressure flue gas on a finned outside surface of the conduits and using condensing refrigerant on the inside of the conduits to increase the heat transfer efficiency and economy for the process.

As in the direct contact water quench towers, direct gas liquid contact in counter-flow absorbers offers the advantages of high material throughput with good heat and mass transfer rates. Heat can be readily transferred from the condensing $CO_2$ ice in the circulating 1-propanol to evaporating low temperature refrigerant. Propanol containing small ice crystals will continually circulate through the contactor with these crystals acting as seed for new ice condensation. Slurry from the bottom of the contactor will be pumped through hydroclones or self-cleaning filters to remove larger ice crystals and produce a concentrated ice and propanol slurry.

Alloy steels such as austenitic stainless are preferred for vessels, internals, exchangers, and piping to prevent embrittlement at the low operating temperature. The use of the direct contact systems minimizes the amount of alloy material required as compared to the gas exchangers proposed by Cooper, Ostemeier, and Donnelly.

| Freezing point | °K. | °C. | °F. | TLV(ppm) |
|---|---|---|---|---|
| Methanol | 175.2 | −98.0 | −144.40 | 200 |
| Ethanol | 159.1 | −114.1 | −173.38 | 1,000 |
| 1-Propanol | 146.6 | −126.6 | −195.88 | 100 |
| 2-Propanol | 184.0 | −89.0 | −128.00 | 200 |
| 1-Butanol | 183.9 | −89.3 | −128.70 | 20 |

To assist in this process various icing seed structures or chemical additives may be included which help with the formation of ice and can control its particle structure and size within the device. Once the ice has formed, the particles of various sizes can be concentrated and removed by devices such as hydroclones or filters. In addition, in this method the concentrated slurry of cold liquid and mixed component ice particles is pumped to increase its pressure to above the carbon dioxide triple point and is delivered to a system of heat exchangers that melt the ice into liquid using condensing cold refrigerants as the heat source. Preferably these heat exchangers use clean low pressure flue gas on a finned outside surface of the heat exchanger conduits and the condensing refrigerant on the inside of the conduits shown in FIG. 3.

Cooling may be supplied by a refrigeration cascade of refrigerants for example R-22, R-503, and R-14. More preferably, non-ozone depleting refrigerants such as R-134a, R-116 and R-14 are used. The refrigerant cascade works by using successively colder refrigerants to condense the next colder refrigerant and achieve the desired final temperature. A mixed refrigerant system may also be used in lieu of maintaining segregated refrigeration systems to reduce the number of refrigeration compressors required. The energy requirement is substantially reduced by using the cold flue gas, propanol slurry and distillation reboiler requirements for condensing refrigerant to reduce the power requirements of the refrigeration cascade. Depending upon the needs of the user, distillation, extraction, selective membranes, or other means can then be utilized to remove $CO_2$ and $SO_2$ from the 1-propanol and water. Water can be removed from the 1-propanol by distillation or preferably by adsorbents or membrane devices since the quantity of water is low after the direct contact water quench. Water is removed from the cold liquid to prevent it from concentrating in the loop.

Multiple distillation configurations can be used. For example virtually pure $CO_2$ can be isolated for sequestration or enhanced oil recovery and virtually pure $SO_2$ for re-sale can be accomplished by those skilled in the art. Pollutant emissions are a prime consideration for a gas treatment system, the table below qualitatively argues the superior performance expected from this system as compared to the previous work by Cooper, Ostemeier, and Donnelly.

| Pollutant | Process | Results |
|---|---|---|
| SO2 | CFGC | Design point of emissions is 1.2 lb/MMBtu |
|  | 1-propanol wash | FGD and direct contact water quench will remove SO2 to a few ppmv |
| NO | CFGC | "Will not be condensed" |
|  | 1-propanol wash | The vapor pressure of NO is still too high for significant removal with the 1-propanol wash |

-continued

| Pollutant | Process | Results |
|---|---|---|
| NO2 | CFGC | "Expect 99% removal at −154° F." |
|  | 1-propanol wash | Temperature at −185° F. should virtually eliminate NO2 in Flue Gas |
| H2SO4 | CFGC | "High collection efficiency expected" |
|  | 1-propanol wash | FGD, water quench, and 1-propanol wash should virtually eliminate H2SO4 |
| Mercury | CFGC | "Expect high collection efficiencies . . . " |
|  | 1-propanol wash | Rectisol methanol wash achieves ppbv levels with −76° F. direct contact methanol wash Even better performance should be achieved with the −185° F. 1-propanol wash |
| Selenium | CFGC | "Comments as for Hg (mercury)-Expect high collection efficiencies" |
|  | 1-propanol wash | Even better performance should be achieved with the −185° F. 1-propanol wash |

A second embodiment of the invention is shown in FIG. 4. Initially, flue gas is cooled with a two stage direct contact water quench and the flue gas is contacted with a cold liquid and ice slurry and the ice is concentrated by hydroclones or filtration as described in the first embodiment above. However, in this embodiment, the concentrated $CO_2$ ice and cold liquid slurry remain at near ambient pressure. The ice is then sublimated with a low temperature refrigerant (e.g. R-14) heat pump and the $CO_2$ is subsequently compressed to the desired pressure. This refrigeration process is estimated to have a COP around 1.5 for the roughly 70° C. temperature lift required. The additional energy obtained from the ice sublimation was found to more than compensate for the additional $CO_2$ compression energy for sequestration. While these embodiments of a cryogenic process for $CO_2$ have been described, various alternative configurations and embodiments can be had without departing from the spirit and scope of the invention as set forth in this description and as included in the claims provided hereafter. Thus, the description of these items should be seen as illustrative and not as limiting.

Depending upon the exact needs of the user a variety of refrigerants including cooling water may be utilized to cool the liquids that cool and condense the preselected substances from the gas. Heat exchange between the refrigerants and the liquids to cool the liquids that cool the gas can be enhanced in a variety of ways including using a clean low pressure flue gas on a finned outside surface of a heat exchange conduit and a condensing refrigerant on the inside of the conduit to increase the heat transfer efficiency and economy of the process. Such a process reduces the energy required to cool the gas by using the cold gas and condensed preselected substances to condense the refrigerants used to cool the liquids (quench) that cool the gas.

Figure 5:
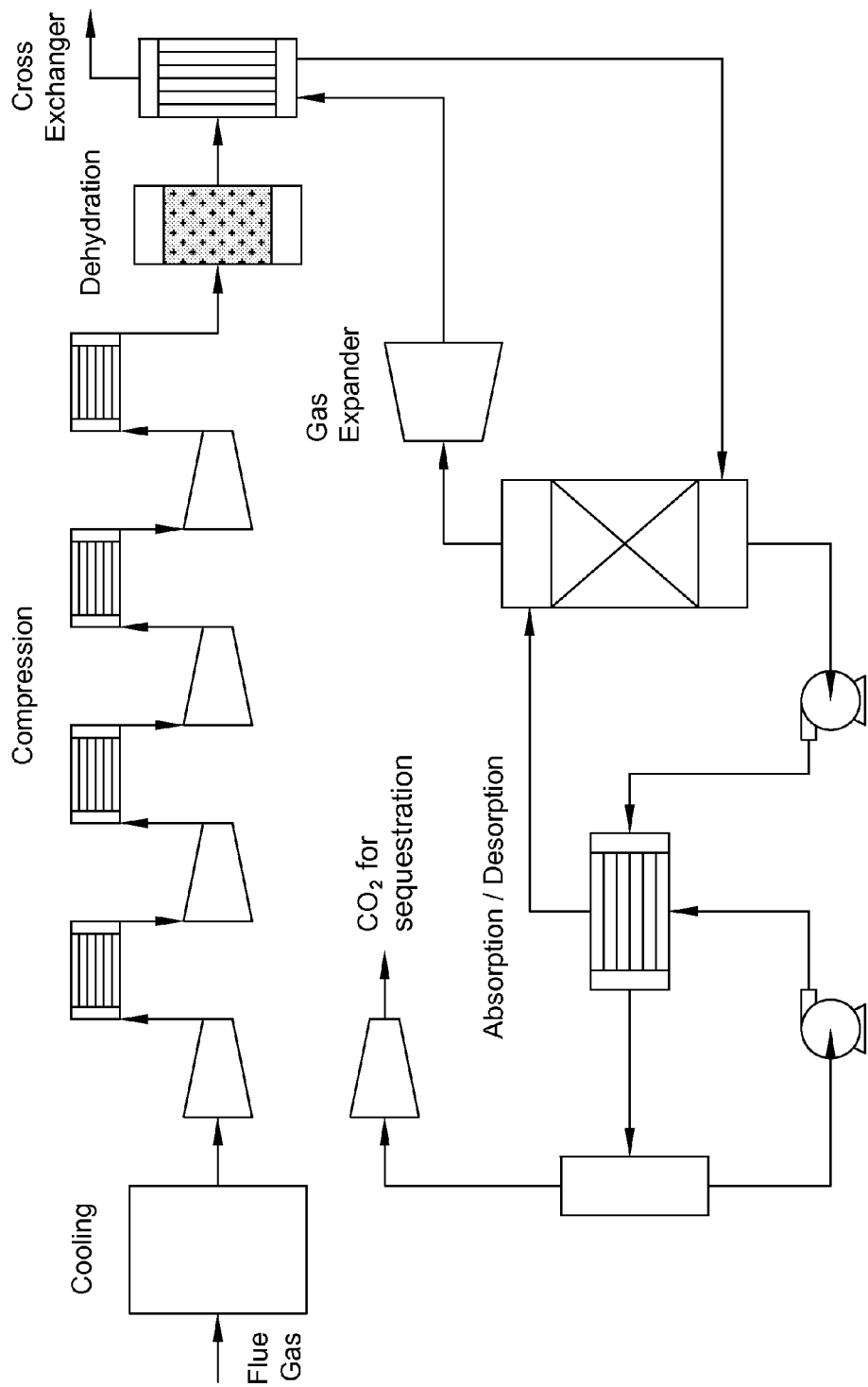
FIG. 5 is a block diagram of a preferred embodiment of the compression capture process of the present invention.
Figure 6:
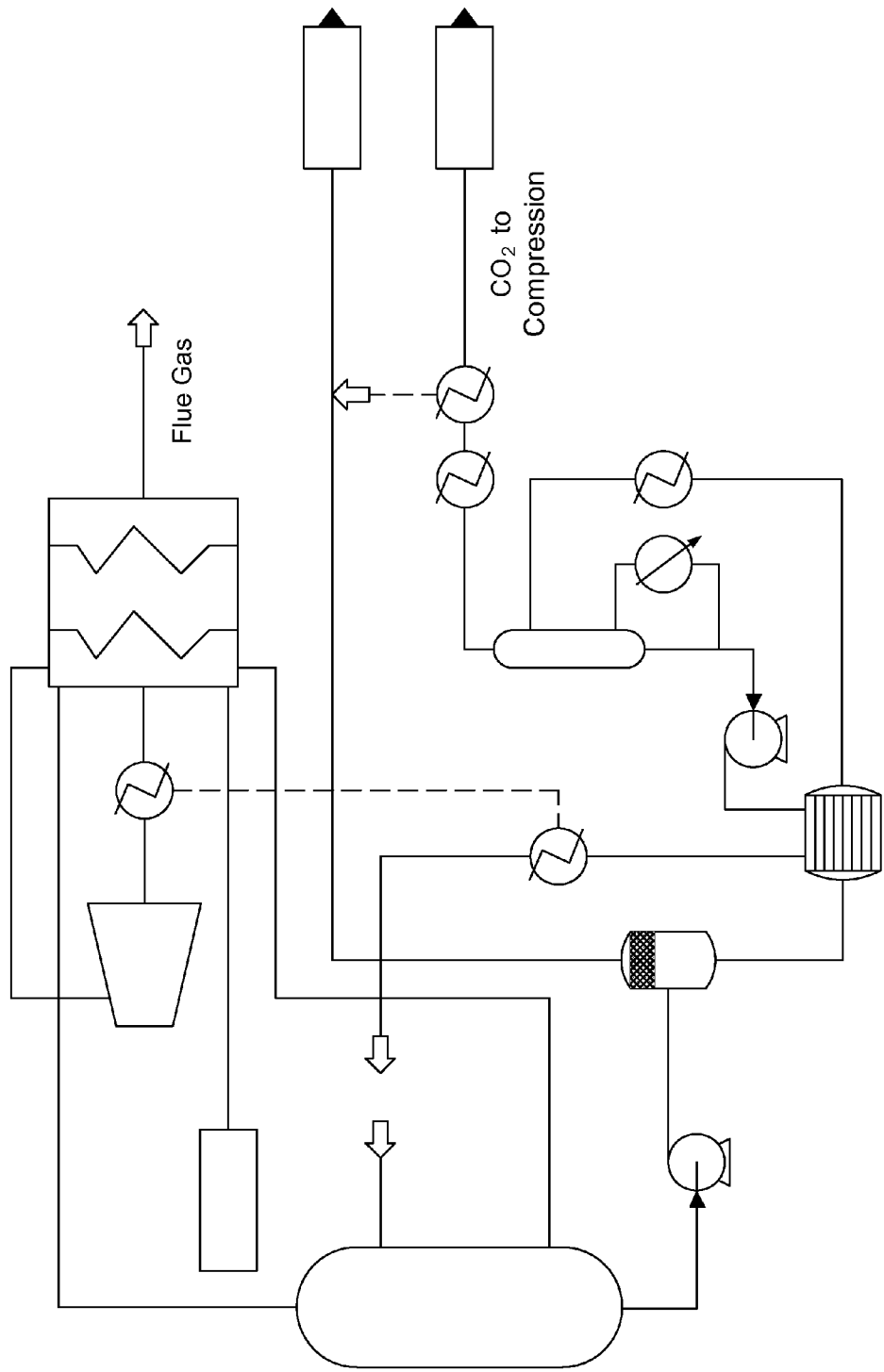
FIG. 6 is an illustration of an absorption-desorption unit and associated heat exchange incorporated in the compression capture embodiment of present invention.

In another embodiment of the invention shown in FIGS. 5 and 6 a compression based methodology is shown. FIG. 5 shows a direct contact cooling system. In such an arrangement the flue gas enters the system and is cooled and partly dehydrated. Preferably, this is done using counter-current trayed or packed columns with the flue gas flowing upward and water flowing downward in one or more stages of contacting. Spray towers or other gas-liquid contactors are also suitable. In this embodiment of the invention a quench water loop is cooled by heat exchange with cooling water. A suitable material (such as caustic or lime for acidic gas streams) may be added to control the pH to a desirable level. During the gas cooling process, water vapor from the flue gas is partially condensed, (For example the water vapor may comprise about 8 mass % or more of the entering flue gas in the case of coal fired power plant flue gas, but only about 3 mass % exiting at 90° F. from the cooler. This water is directly assimilated in the circulating quench loop and excess water produced in the loop may be re-used for other process requirements such as cooling water makeup. In this way the high latent heat of the water vapor is being rejected to the least expensive cooling utility.

Following cooling as described above, the gas is compressed in equipment suitable for the intended purpose. The preferred equipment for this compression is a multistage centrifugal compressor with inter-stage and after-cooling. In this manner the compression energy remains low compared to other methods by limiting the temperature increase and subsequent power consumption of compression and additional water is condensed from the gas stream by the intercoolers. Axial flow compressors without intercoolers may be used with the advantage that the equipment cost is reduced and the disadvantage that the power required to compress the gas is increased. Reciprocating, compressors and wet screw compressors are other examples of equipment that may be used to compress the flue gas but in general do not have the high throughput capacity of centrifugal or axial flow compressors.

Compression to approximately 120 psia is preferred for efficient downstream pollutant removal but a wide range of operating pressure is possible for the invention to function satisfactorily. After-cooling the compressed gas will advantageously remove additional water from the flue gas stream.

Following compression and after-cooling, the flue gas is virtually completely dried. This drying may be accomplished by using one of several methods. Examples are triethylene glycol contacting, membrane permeation or adsorption with a regenerable adsorbent such as a small pore molecular sieve. A suitably designed system will dry the gas to a few parts per million water. Drying the gas to this low level of moisture is advantageous to prevent ice formation in the cold downstream heat exchange equipment. The dry compressed flue gas then is further cooled by cross exchange to a temperature lower than ambient by cross exchange with the expanded treated gas (a preferred temperature is −35° C.). The gas is then purified by treating it with one or more adsorbents including, but not limited to propylene carbonate, methanol (Rectisol), a mixture of polyethyleneglycol dimethyl ethers (Selexol™), normal methyl pyrrolidone (NMP) or other materials capable of absorbing $CO_2$. The materials just described physically absorb CO2 and do not form stable intermediate compounds such as those formed by amines or other materials that will react with CO2, SO2, and other pollutants in the flue gas stream. Such compounds are commonly collectively called physical sorbents. Their capacity for pollutants increases with the increased pressure and reduced temperature—conditions preferred for the invention.

Since the gas is dehydrated prior to the absorption or adsorption, other preferred materials are solid sorbents (e.g. metal oxide framework materials) or ionic liquids that characteristically adsorb or react with water, if present. The interaction with water results in substantial loss of pollutant capacity and requires significant additional regeneration energy for water removal. However, these materials may be used advantageously in dry flue gas. Propylene carbonate is a particularly attractive physical absorbent because 1) it has a high absorption capacity for CO2, the primary pollutant, 2) it is stable in the absence of water, 3) it has low vapor pressure at process conditions, 4) it is readily commercially available, 5) it is non-corrosive, 6) has relatively low flammability and toxicity. Treated gas leaving the absorber is expanded to near ambient pressure in a gas expander/generator. The expansion generates a substantial amount of power and results in gas cooling to temperatures on the order of −135° F. (Provided about 90% of the CO2 is absorbed from the flue gas, the process simulation predicts no dry ice will form in the cold expanded flue gas. The cooled gas is then cross exchanged with lean sorbent returning to the absorber and incoming compressed gas before discharge at near ambient temperature to the atmosphere.

After leaving the absorber, the propylene carbonate containing $CO_2$ and other pollutants flows through a hydraulic turbine where some pumping energy is recovered and the pressure of the sorbent is reduced to near atmospheric pressure. The pressure reduction results in some $CO_2$ and other pollutants flashing from the sorbent. The remaining $CO_2$ and other pollutants are then cross exchanged with the regenerated sorbent returning to the absorber and delivered to a stripper where heat supplied by warm water or very low pressure steam to a temperature of approximately 130° F. removes the remaining absorbed $CO_2$ and other pollutants.

A significant amount of propylene carbonate will vaporize into this predominantly $CO_2$ stream from the pressure flash and stripper. However, compression for further processing or sequestration results in condensing virtually all of the propylene carbonate from the pollutant stream for return to the absorption loop. Methanol is also a preferred absorbent for the invention having many similar characteristics to propylene carbonate, but higher vapor pressure, flammability, and toxicity. The physical absorbents are in general non-corrosive to common carbon steel construction components. (Operation to −40° C. requires only minor modification to conventional carbon steel components.) In contrast, many of the chemical sorbents require extensive corrosion inhibition and are limited in concentration because of their corrosive nature. Operation and regeneration at low temperature in the oxygen containing flue gas is an advantage in that oxidation of the solvent is minimized.

Absorption of pollutants into the flue gas can be performed in conventional gas-liquid contacting equipment such as trayed or packed distillation towers designed for intimate contact of gas and liquid. The absorbent can then be regenerated by pressure reduction and/or circulating hot water or very low pressure steam or other heat source at about 130° F. in the case of propylene carbonate. Pollutants recovered from the regeneration may then be further processed or compressed for geological sequestration as required. Since the recovered gas is dry, corrosion by the pollutants in downstream process equipment.

After regeneration the lean propylene carbonate from the stripper is then cooled by cross exchange with the rich propylene carbonate from the absorber and recycled back to the absorber where the process is repeated. The treated gas, exiting the absorber is expanded near ambient pressure in a turbo-expander/generator, cooling the gas to approximately −150° F. and generating a large amount of electric power. The electric power produced advantageously offs a large portion of the electric power required for compression and thus increases the overall efficiency of the process. For application to coal fired power plant flue gas treatment, the present embodiment of the invention has several advantages.

Compared to oxyfueled combustion, (where an air separation unit (ASU) is used, the present invention 1) has virtually the same volume of flue gas for compressed as air required for the ASU. Thus the compression equipment size will be virtually identical. The preferred pressure is slightly higher than typical ASU pressure, but the power generated by the flue gas expansion in the present invention more than compensates for the increased compression power of this embodiment. 2) No boiler or heat recovery modifications are required as has been indicated to be necessary for oxyfueled combustion. 3) Oxyfueled combustion still requires additional treatment for many of the pollutants in the high CO2 gas produced by that process—whereas these pollutants are largely removed in the present invention. 4) From a cost perspective, the present invention utilizes essentially the same compression equipment is but the ASU of oxyfueled combustion requires more expensive equipment than the ASU since the cryogenic temperatures required for oxygen separation also requires alloy materials such as austenitic stainless steel in heat exchangers and distillation towers. In contrast, relatively small amounts of alloy are preferred in the present invention downstream of the gas expander for heat exchange with the incoming flue gas and absorbent.

Compared to flue gas treatment by MEA. 1) Amine treatment requires separate $SO_2$ removal since MEA reacts so strongly with $SO_2$ that the resulting salt is not broken by thermal regeneration as is the case for $CO_2$. 2) The regeneration of CO2 from MEA requires nearly half of the power plant steam and thus greatly reduces the power produced. In the present embodiment of the invention, the net power requirement is substantially less than for the MEA process. 3) From a cost perspective, the absorption equipment of the present invention is smaller because of a higher operating pressure than for MEA, however, the compression and expansion equipment is more expensive than equipment for the MEA process. Thus the processes are probably close in cost.

Simulations of both propylene carbonate and methanol absorbents were performed using the process simulator AspenPlus™ to determine the power requirements relative to MEA. The table below summarizes the results compared to the NETL Case 12 MEA power requirements. As shown, the present invention has a significantly lower power requirement than MEA. Intrinsically, a power requirement advantage also exists for the present invention over oxyfueled combustion. The gas compression power will be slightly higher for the present invention, but the gas expander of the present invention generates sufficient power to guarantee the benefit of the present invention compared to oxyfueled combustion.

| Power Consumption Compression-PC Absorption | | kW | NETL Case 12 MEA | |
|---|---|---|---|---|
| ID Fans | | 10,746 | ID Fans | 10,120 |
| PC Absorption Auxiliaries | | 4,180 | Econamine Auxiliaries | 21,320 |
| HT-6120 | −2,802 | | | |
| Return pump | 4,982 | | | |
| Misc pumps & regen | 2,000 | | | |
| TE-6160 | | −63,749 | | |
| CO2 Compression | | 62,004 | CO2 Compression | 46,900 |
| Air Compression | | 193,533 | Lost Steam Power | 206,000 |
| Auxillary Power Requirement | | 206,714 | | 284,340 |

While various preferred embodiments of the invention are shown and described, it is to be distinctly understood that this invention is not limited thereto but may be variously embodied to practice within the scope of the following claims. From the foregoing description, it will be apparent that various changes may be made without departing from the spirit and scope of the invention as defined by the following claims.

What is claimed is:

1. A method for removing a preselected substance from a flue gas stream comprising:
   cooling the flue gas stream by direct contact with a cool liquid to remove water from the flue gas stream;
   compressing the flue gas stream to approximately 120 psia to remove additional water;
   dehydrating the compressed flue gas stream with either a first absorbent or a first adsorbent;
   cooling the compressed, dehydrated flue gas stream by indirect heat exchange with cold expanded flue gas components;
   contacting the compressed, dehydrated flue gas stream with a second absorbent or a second adsorbent to physically absorb or adsorb the preselected substance;
   regenerating the second absorbent or the second adsorbent, thereby releasing the preselected substance from the second absorbent or the second adsorbent into a separate stream; and
   expanding the compressed, dehydrated, treated flue gas stream through a gas expander, thus producing electric power, and cooling the expanded stream which is reheated by indirect heat exchange with the compressed, dehydrated flue gas stream.

2. The method of claim 1 wherein at least one of said preselected substances contains a material selected from the group consisting of $CO_2$, $SO_2$, NO2, HCL, $H_2SO_4$, $SO_3$, Hg, As, Se.

3. The method of claim 1 wherein heat exchange is performed between cooling water and the cool liquid in order to cool and condense water from the flue gas stream.

4. The method of claim 1 wherein contact between the flue gas stream and the cool liquid is performed in a quench tower, a spray tower, or a venturi scrubber.

5. The method of claim 1 wherein the compressing the flue gas stream comprises using a multistage compressor with intercoolers and an aftercooler to condense additional water from the compressed flue gas stream.

6. The method of claim 1 wherein the first adsorbent is triethylene glycol, the first absorbent is a small pore molecular sieve, and wherein the second absorbent is at least one of the following: propylene carbonate, methanol, a mixture of polyethyleneglycol dimethyl ethers, and normal methyl pyrrolidone (NMP), and wherein the second adsorbent is at least one of the following: metal organic frameworks, $CO_2$ selective natural zeolites, and $CO_2$ selective man-made microporous materials.

7. The method of claim 1 wherein the compressing the flue gas stream comprises using an axial flow compressor and an aftercooler to condense water from the compressed flue gas stream.

* * * * *